United States Patent
Sato et al.

(10) Patent No.: US 7,508,155 B2
(45) Date of Patent: Mar. 24, 2009

(54) CONTROLLER

(75) Inventors: Takashi Sato, Yamanashi (JP); Kokoro Hatanaka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 114 days.

(21) Appl. No.: 11/682,774

(22) Filed: Mar. 6, 2007

(65) Prior Publication Data

US 2007/0210740 A1 Sep. 13, 2007

(30) Foreign Application Priority Data

Mar. 7, 2006 (JP) ............................. 2006-061592

(51) Int. Cl.
 *G05D 15/00* (2006.01)
(52) U.S. Cl. .................... 318/646; 318/568.12; 318/437
(58) Field of Classification Search ................. 318/646, 318/568.12, 437
 See application file for complete search history.

(56) References Cited

U.S. PATENT DOCUMENTS

| | | | |
|---|---|---|---|
| 5,781,705 A * | 7/1998 | Endo | 700/262 |
| 5,994,864 A * | 11/1999 | Inoue et al. | 318/568.2 |
| 6,515,442 B1 * | 2/2003 | Okubo et al. | 318/560 |
| 6,913,327 B2 * | 7/2005 | Thomas | 303/155 |
| 6,919,701 B2 * | 7/2005 | Nagata et al. | 318/568.12 |
| 2003/0132726 A1 * | 7/2003 | Dohring et al. | 318/437 |

FOREIGN PATENT DOCUMENTS

| | | | |
|---|---|---|---|
| JP | 61264414 A | 11/1986 |
| JP | 5177562 A | 7/1993 |
| JP | 6-328379 A | 11/1994 |
| JP | 7186076 A | 7/1995 |

OTHER PUBLICATIONS

Notice of Reasons for Rejection of Patent Application No. 2006-061592 mailed Dec. 4, 2007.

* cited by examiner

*Primary Examiner*—Bentsu Ro
*Assistant Examiner*—David S Luo
(74) *Attorney, Agent, or Firm*—Lowe, Hauptman, Ham & Berner, LLP

(57) ABSTRACT

A controller includes a first data acquiring portion for acquiring a time constant of a position control circuit based on a position command value to a drive source and an actual position value, during operation of a controlled object; a second data acquiring portion for acquiring a rigidity value for the controlled object and a workpiece based on a force data obtained when the controlled object is brought into contact with the workpiece; and an automatic gain calculating portion for calculating a force control gain of a force control circuit from the time constant of the position control circuit acquired by the first data acquiring portion and the rigidity value acquired by the second data acquiring portion, under conditions where a time constant of the force control circuit is larger than the time constant of the position control circuit.

4 Claims, 5 Drawing Sheets

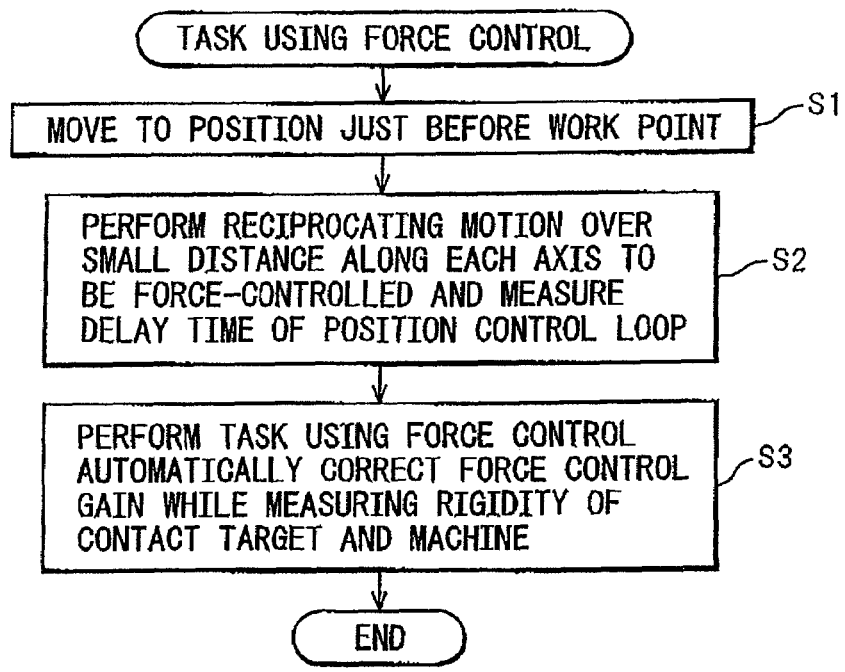
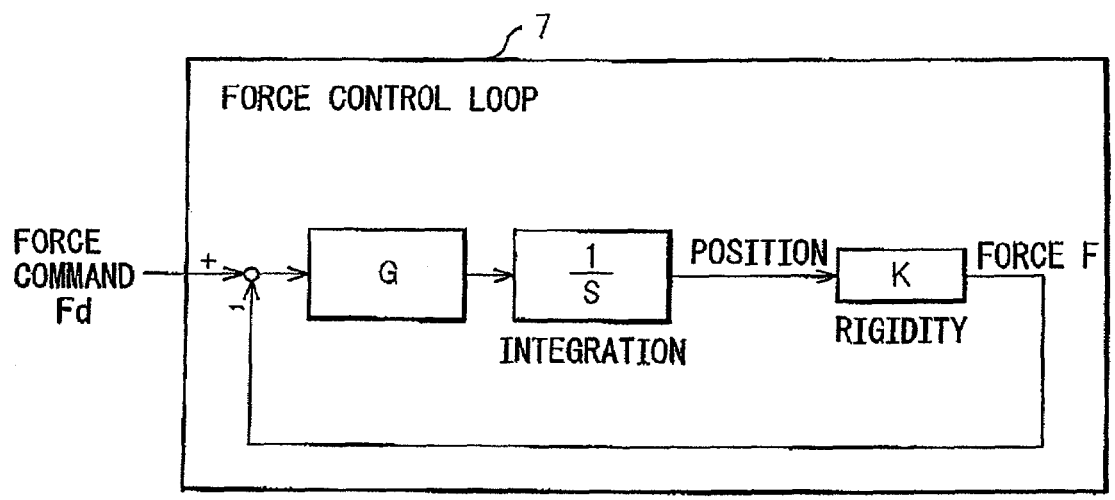

CONTROLLER

CROSS REFERENCE TO RELATED APPLICATION

This application is based upon, and claims the benefit of priority from, the prior Japanese Patent Application No. 2006-061592, filed on Mar. 7, 2006, the entire contents of which are incorporated herein by reference.

BACKGROUND OF THE INVENTION

1. Field of the Invention

The present invention relates to a controller for force-controlling a controlled object such as an industrial robot or a machine tool that is configured to perform a task such as assembling or grinding, wherein the controller incorporates a position control circuit inside a force control circuit to force-control the controlled object.

2. Related Art

A controller for force-controlling a controlled object is operated to control an industrial robot or the like after setting and/or adjusting the force control gain of its force control circuit. The force-controlled industrial robot can carry out precision work that involves contacts such as fitting of precision components, adjustment of gear phases, and grinding using a grinder. To enable the robot to carry out such precision work stably in short cycle times, the force control gain of the force control circuit must be properly set and adjusted.

As the force control gain is influenced by the actual work environment such as the mass and inertia of a hand tool attached to the end of the robot, the spring constants of the robot, hand tool, and workpiece, and the posture of the robot during the work, the amount of overshoot with respect to a force command value must be detected by applying a prescribed force in each direction to be force-controlled (each drive axis direction) and gradually increasing the gain from a sufficiently low gain, and an upper limit value of the force control gain must be determined within the range in which the amount of overshoot does not exceed a predetermined value. However, this method has the problem that there are many limitations and it takes time and skill to accomplish the adjustment.

On the other hand, it is also possible to set the force control gain automatically. To set it automatically, work is performed while gradually increasing the force control gain under program control, the waveform of the force is recorded during the process, and the appropriate force control gain is calculated by calculating the rise time, the amount of overshoot, the vibration components, etc. With this method, however, care must be taken when setting the initial value of the force control gain for adjustment; if the force control gain is set higher than the appropriate force control gain, the force control may oscillate in the first try and may cause damage to the robot or machine performing the work or to the hand tool attached to the machine, the workpiece being worked on, etc. Conversely, if the adjustment is performed starting with a low force control gain in order to avoid such a situation, the number of tries increases, resulting in the problem that it takes time to accomplish the adjustment. Further, in the case of a multi-axis robot, as the space where the force control is performed often contains a space of six axes, i.e., three translational axes and three rotational axes around the translational axes, if the force control gain is to be set for each of these axis, a great deal of time has to be expended to accomplish the gain setting.

Furthermore, when adjusting the force control gain, an environment that causes a physical contact with the workpiece has to be created for each axis direction. The reason is that, when there happens to be no contact in a certain axis direction, if the value of the force control gain obtained in such a situation were used without correction, the force might become unstable when a contact occurred in an actual environment. For example, when inserting a keyed rod 41 into a hole 42 as shown in FIG. 6, the only direction in which a contact occurs when the rod 41 is dislocated from the hole 42, as shown, is the Z direction which is the direction of insertion; therefore, in this case, no contact occurs in the X or Y direction, and the adjustment of the force control gain in the X and Y directions cannot be done until after the rod 41 has been inserted in the hole 42.

As another example, consider a situation where, for example, when inserting a cylindrically shaped workpiece into a hole, the amount of clearance for insertion is very small; in this case, if the adjustment is performed starting from a low force control gain, there arises a problem that the workpiece cannot be inserted because the force control performance is poor. In this way, there are cases where, at the early stage of the force control gain adjustment, two components have to be fitted together when the performance of the force control gain is poor, thus giving rise to a contradiction when setting or adjusting the force control gain.

As another example of the control method, JP-A-06-328379 discloses a method that has a large number of motion correction modules and that switches the motion mode according to the working condition, though this method is not one that controls the controlled object by appropriately controlling the force control gain in accordance with various working conditions.

SUMMARY OF THE INVENTION

In view of the above situation, it is an object of the present invention to provide a controller that can easily accomplish the setting and adjustment of the force control gain by eliminating the time required to repeatedly try the adjustment, and that can avoid the problem involving the contradiction that, at the early stage of the gain adjustment, the component must first be inserted in order to adjust the gain but, if it is to be inserted, the gain must be set reasonably high.

To achieve the above object, according to one mode of the present invention, there is provided a controller, for force-controlling a drive source of a controlled object, having a position control circuit inside a force control circuit, in order to define a relative position of the controlled object to a workpiece, and a contact force occurred between the workpiece and the controlled object, the controller comprising: a first data acquiring portion for acquiring a time constant of the position control circuit based on a position command value to the drive source and an actual position value, during operations of the controlled object; a second data acquiring portion for acquiring a rigidity value for the controlled object and the workpiece based on force data obtained when the controlled object is brought into contact with the workpiece; and an automatic gain calculating portion for calculating a force control gain of the force control circuit from the time constant of the position control circuit acquired by the first data acquiring portion and the rigidity value acquired by the second data acquiring portion, under conditions where a time constant of the force control circuit is larger than the time constant of the position control circuit.

According to this invention, the time constant of the position control circuit is acquired by the first data acquiring portion, the rigidity value of the controlled object is acquired by the second data acquiring portion, and the force control gain is calculated by the automatic gain calculating portion from the time constant of the position control circuit and the rigidity value of the controlled object; as a result, the setting and adjustment of the force control gain can be easily accomplished without spending time and labor in the setting of the gain as in the prior art, and the problem can be solved that involves the contradiction that at the early stage of the gain adjustment, the component must first be inserted in order to adjust the gain but, if it is to be inserted, the gain must be set reasonably high. It also becomes possible to flexibly address changes in the installation of the robot or the machine or in job programs (job steps, etc.), thus achieve a controller having a high degree of versatility.

In another mode of the controller, the force data can be detected by a force sensor attached to the controlled object near a position that contacts the workpiece.

According to this invention, as the force data are detected by the force sensor provided near the contact position of the controlled object, the rigidity value can be estimated with high accuracy.

In another mode of the controller, the force data can be acquired from an electric current value of an actuator that drives the controlled object.

According to this invention, as the force data is acquired from the electric current value of the actuator, the rigidity value can be estimated in a simple manner and at low cost.

In another mode of the controller, the force control can be applied as damping control.

According to this invention, as the present invention can be applied to damping control widely used in industry, it becomes possible to easily accomplish the gain adjustment of the damping control, serving to further widespread use of the damping control.

BRIEF DESCRIPTION OF THE DRAWINGS

The above and other objects, features, and advantages of the present invention will become more apparent from the description of the preferred embodiments as set forth below with reference to the accompanying drawings, wherein:

FIG. 4 is a flowchart for explaining a method of force control gain calculation;

FIG. 5 is a block diagram showing a force control circuit by assuming it to be a first-order lag model.

DETAILED DESCRIPTION

Figure 1:
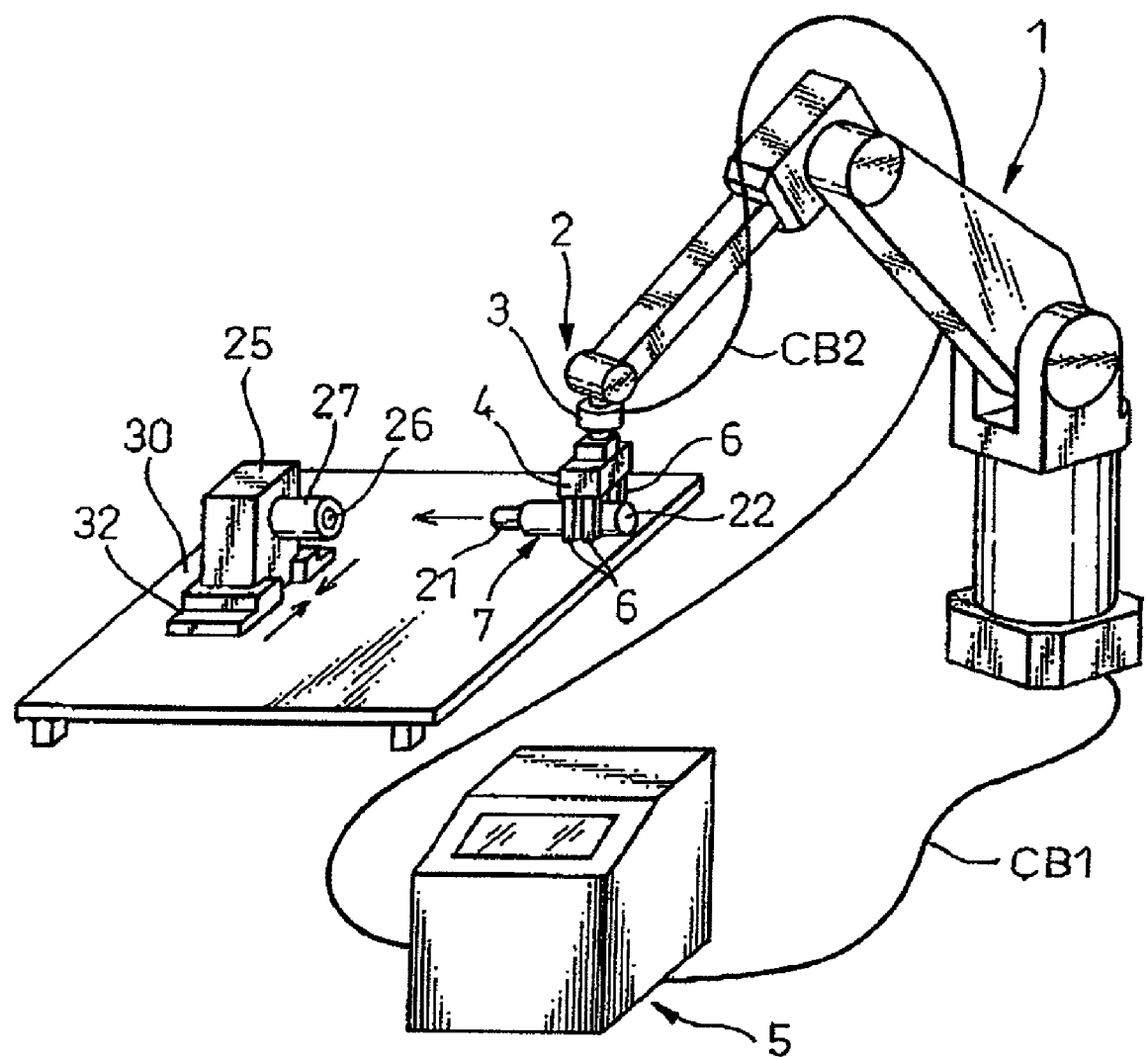
FIG. 1 is a perspective view showing one embodiment of a robot control system containing a controller according to the present invention.

A robot controller (controller) according to the present invention will be described with reference to the drawings. FIG. 1 shows a six-axis robot as a controlled object which has three translational axes and three rotational axes. A controller for force-controlling a robot such as shown here can be classified into two main types of system: one is a system having a position control circuit connected in series inside the force control circuit, and the other is a system having a position control circuit connected in parallel outside the force control circuit. The controller according to the present invention (FIG. 2) is based on the system having a position control circuit connected in series inside the force control circuit (see FIG. 3), and is configured to be able to force-control the contact that the robot makes with the workpiece and to automatically set the force control gain based on the time constant (delay) of the position control circuit and the combined rigidity of the robot and workpiece (depending on the control system, the rigidity can be replaced by the rigidity of the robot).

Here, the combined rigidity of the robot and workpiece is taken as the rigidity to be estimated, but in recent years, many robots and machines have come to be designed with emphasis on high-speed capability and reduced weight, and the rigidity of the robot or the machine is mostly lower than that of the workpiece as a contact target; in this case, as the influence of strength on the force control system is predominantly the rigidity of the machine, there will be no problem if the rigidity of the contact target is substituted for the combined rigidity of the robot and contact target.

The robot shown in FIG. 1 is configured to perform a component fitting task. This robot is connected to the robot controller 5 via a cable CB1, and a force sensor 3 is attached to its arm end 2. The force sensor 3 is constructed from a bridge circuit or the like which includes a strain gauge, and detects the forces in the six axis directions acting on the detection part of the force sensor 3 and sends the detected force data to the robot controller 5 via a cable CB2 to force-control the robot 1. A hand tool 4 attached or fixed to the force sensor 3 opens and closes its hand 6 to grip the target workpiece 20 at a suitable position.

In the present embodiment, the target workpiece 20 is shown as a two-stage cylindrically shaped assembly component having a protruding portion 21 and a bottom face 22. On the other hand, the mating workpiece 25 is an assembly component formed with a cylindrical portion 27 having a recessed portion 26; the workpiece 25 is fed onto a positioning device 32 mounted on a work table 30 and is positioned in place. The recessed portion 26 is formed concentrically with the cylindrical portion 27, and is sized so as to tightly hold the protruding portion 21 of the target workpiece 20 inserted therein. The mating workpiece 25 has a unique coordinate system (work coordinate system) with reference points set on the workpiece, which is stored in the memory of the robot controller 5. The robot 1 also has a unique coordinate system (robot coordinate system) with reference points set on the robot 1, which is stored in the memory of the robot controller 5. The robot controller 5 translates the coordinates of the workpiece 25 and the robot 1 in the respective coordinate systems into the coordinates in a common coordinate system so that the workpieces 20 and 25 can be fitted together reliably.

Figure 2:
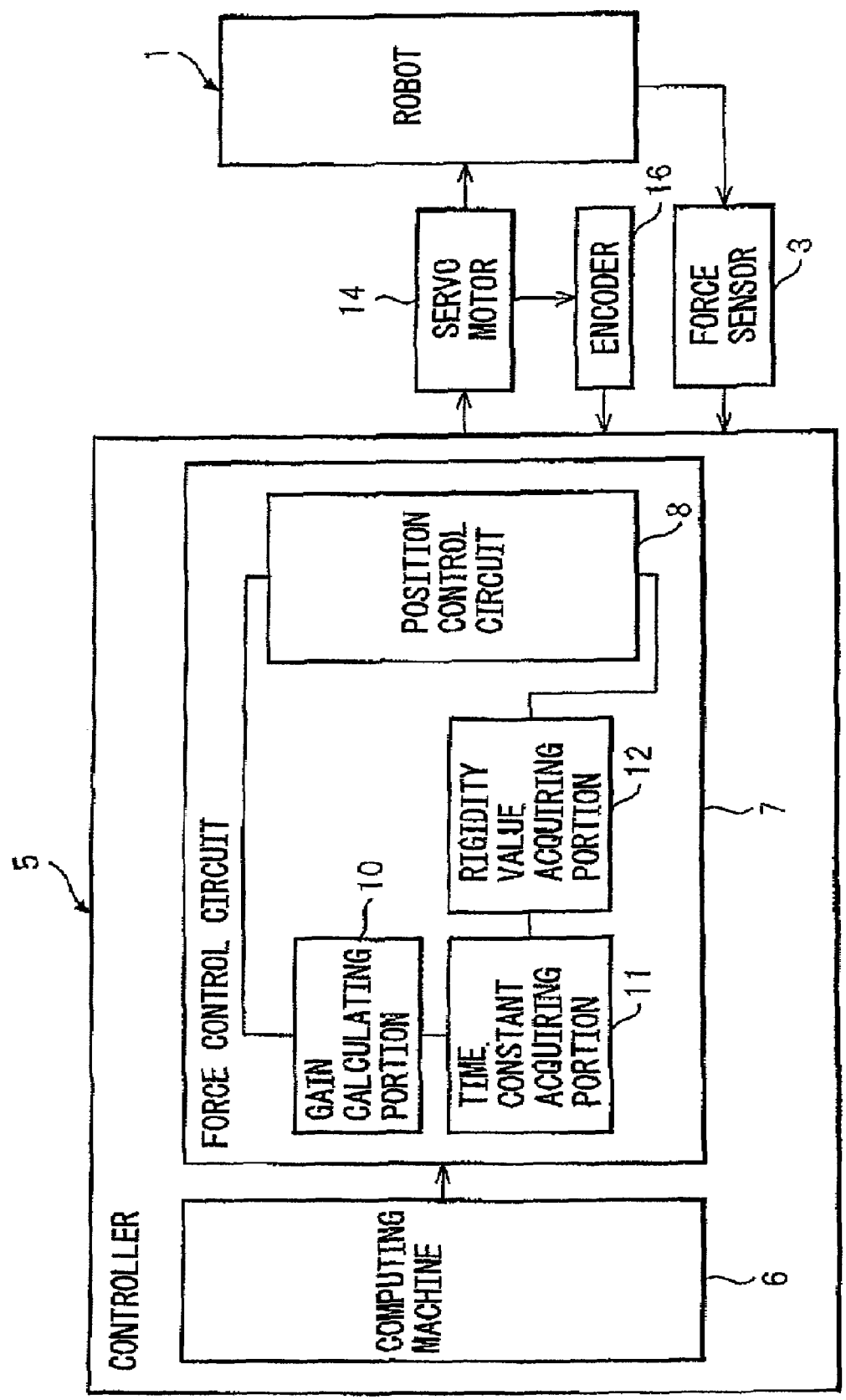
FIG. 2 is a diagram showing the configuration of the controller shown in FIG. 1.
Figure 3:
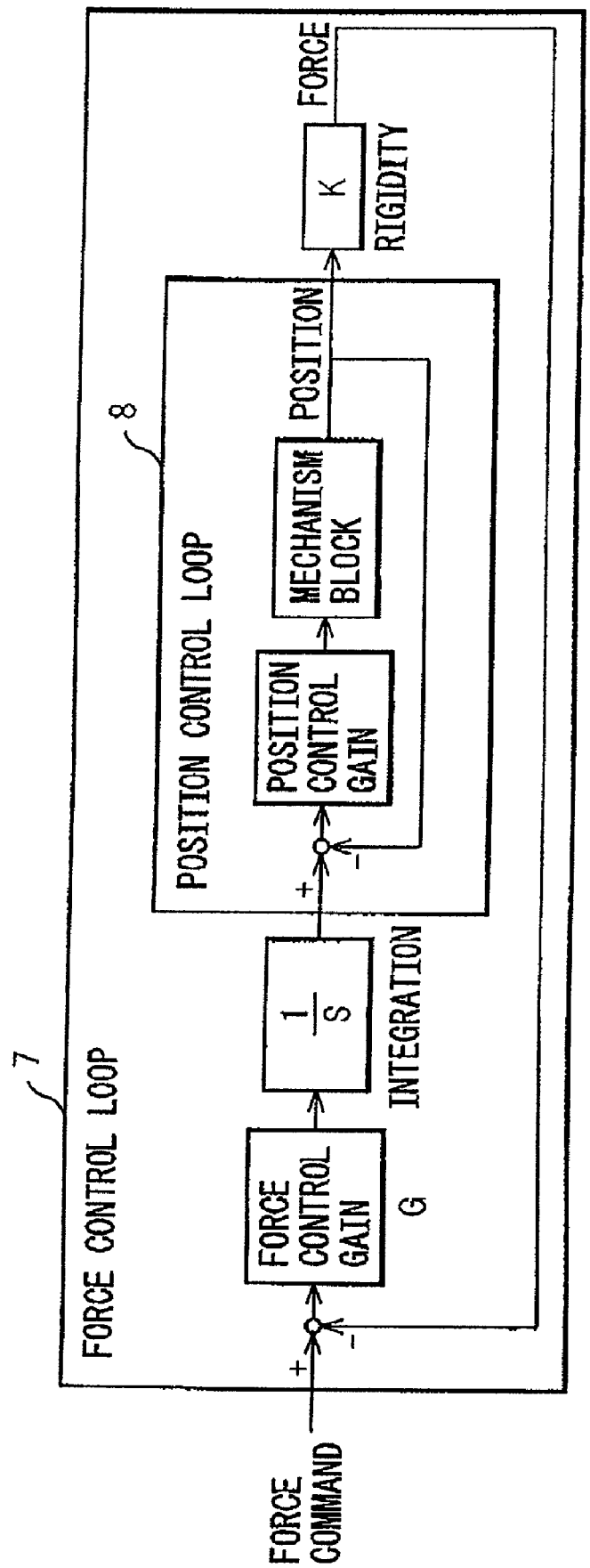
FIG. 3 is a block diagram showing the flow of a control signal in the controller.
Figure 6:
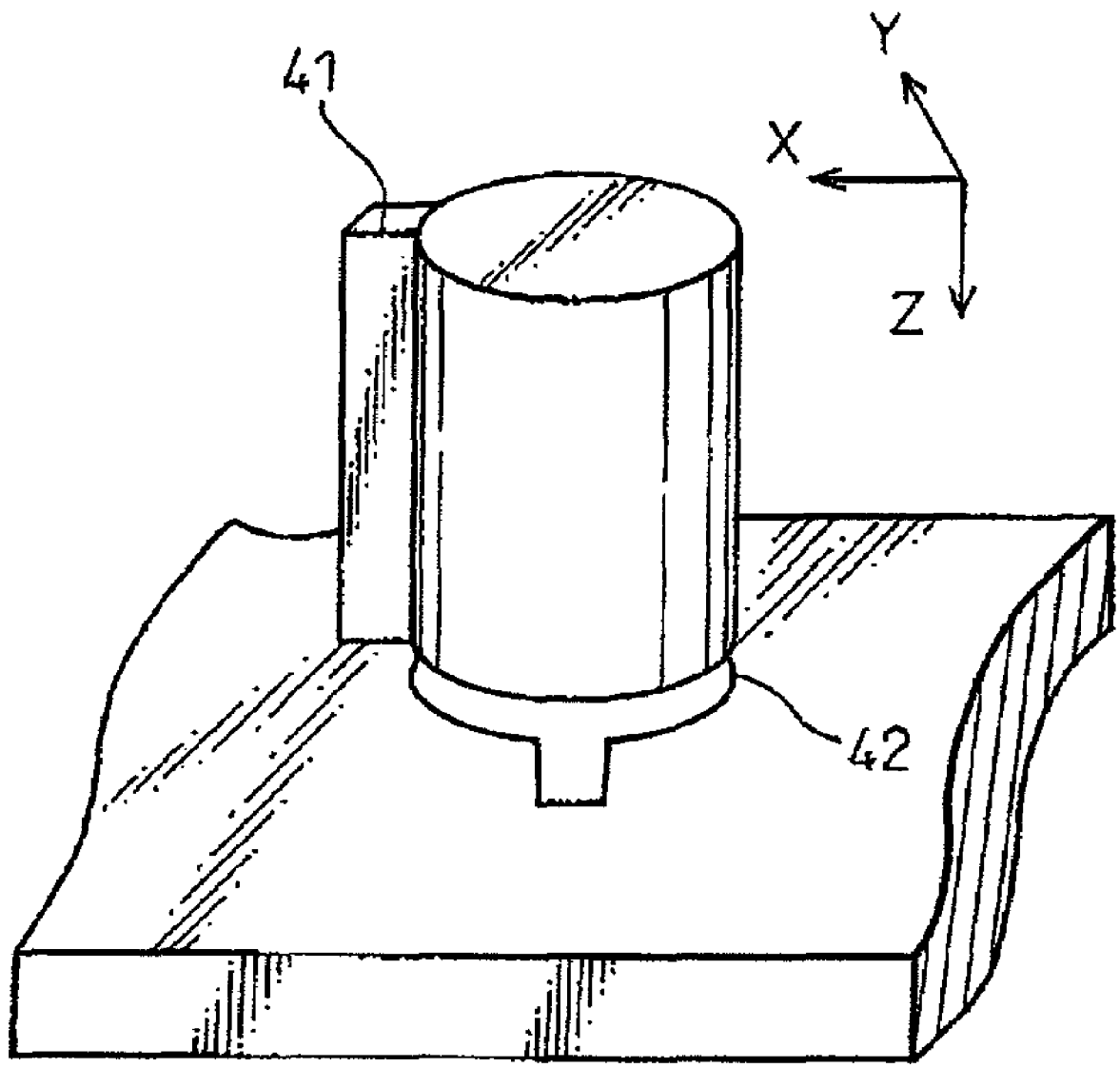
FIG. 6 is a diagram for explaining how a keyed rod is inserted in a hole.

As shown in FIG. 2, the robot controller 5 comprises a computing machine 6 which creates and outputs a force control command value, a force control circuit 7 which corrects the force command value based on the actual force data detected by the force detector, a position control circuit 8 which is located inside the force control circuit 7 and outputs a speed command, a speed control circuit not shown which is located inside the position control circuit 8 and outputs a torque command value, and a current control circuit not shown which converts the torque command value into a current command value and controls a servo motor 14 (drive source) via a servo amplifier not shown. The force control circuit 7, the position control circuit 8, the speed control circuit, and the current control circuit together constitute a digital servo circuit for actuating the axes of the robot 1. In the present embodiment, the force sensor 3 as a force detector, an encoder 16 as a position/speed detector, a CCD camera, etc. are not contained in the robot controller 5, but these components may be contained in the controller.

The computing machine 6 contains a CPU (Central Processing Unit). A memory constructed from a ROM, a memory constructed from a RAM, a nonvolatile memory, a teach operation panel equipped with a liquid crystal display, various interfaces, and various memories are connected to the CPU via a bus. The force sensor 3, display monitor, CCD camera, etc. can be connected to the interfaces.

The force control circuit 7 includes: a time constant acquiring portion (first data acquiring portion) 11 for estimating the time constant T of the position control circuit 8 for each drive axis of the robot 1 when the robot 1 is operated under actual control conditions to fit the target workpiece 20 into the mating working 25; a rigidity value acquiring portion (second data acquiring portion) 12 for estimating the rigidity value K of the robot 1 when the target workpiece 20 gripped by the hand tool 4 of the robot 1 is brought into contact with the mating workpiece 25; and a gain calculating portion 10 for calculating the force control gain G of the force control circuit 7 from the time constant T estimated by the time constant acquiring portion 11 and the rigidity value K estimated by the rigidity value acquiring portion 12, under conditions where the time constant of the force control circuit 7 is larger than the time constant T of the position control circuit 8.

As will be described in detail later, the time constant acquiring portion 11 estimates the time constant T of the position control circuit 8 by an adaptive filter by using the position command given to the robot 1 and the data indicating the actual robot position. The estimated time constant T varies in accordance with environmental conditions including the position of the robot 1, posture of the robot 1, and the inertias of the workpieces 20 and 25. The force control gain G is thus obtained as a function of the time constant which in turn is a function of the position and posture of the robot 1, etc.

The rigidity value acquiring portion 12 estimates the rigidity value by an adaptive filter by using the force data obtained when the target workpiece 20 gripped by the hand tool 4 of the robot 1 is brought into contact with the mating workpiece 25 and the data indicating the position of the robot 1 at the time of the contact (such rigidity is sometimes called environmental rigidity because the rigidity value is determined by the environmental conditions of the robot).

Force detection methods that can be employed for the robot 1 or the like that performs force control include, for example, a method that uses the force sensor 3 attached to the arm end 2, a method that estimates the force acting on the target object from the torque value of the torque sensor attached to each axis of the robot 1, and a method that estimates the force acting on the target object from the value of the electric current of each axis motor of the robot 1; the present embodiment uses the force sensor 3. According to Hooke's law, the force detected by the force sensor 3 is equal to the product of the amount of displacement between the robot 1 and the workpieces 20 and 25 and the rigidity K between the robot 1 and the workpieces 20 and 25. Using the force sensor 3, the rigidity value K can be estimated with high accuracy.

Here, the method that estimates the force data from the torque value of the torque sensor attached to each axis of the robot 1 or the method that estimates it from the motor current value may be employed.

Next, the method for automatically adjusting the force control gain will be described. FIG. 4 shows a flowchart. In step S1, the robot 1 is moved to a position near the work point; then, the time constant T of the position control circuit 8 when the robot 1 is operated to perform reciprocating motion along each drive axis is estimated in step S2, and the rigidity K between the robot 1 and the workpieces 20 and 25 when the workpieces 20 and 25 are brought into contact with each other is estimated in step S3, after which the force control gain G is automatically set based on the time constant T of the position control circuit 8 and the rigidity K between the robot 1 and the workpieces 20 and 25. The method for estimating the time constant T of the position control circuit 8, the method for estimating the rigidity K, and the method for calculating the force control gain G will be described below.

In the method for estimating the time constant T of the position control circuit 8, the robot 1 is operated to perform reciprocating motion along each axis direction for which force control is performed and, from the commanded position and the actual position achieved, the time constant T that corresponds to the delay time of the position control circuit 8 is estimated. More specifically, T is estimated by assuming that the position control circuit 8 is a first-order lag model $(1/(T \cdot s+1))$.

Letting u(k) represent the commanded position, y(k) the actual position, and $\Delta t$ the calculation cycle of the position control circuit, the equation of the adaptive filter in discrete value form is given by $$y(k) - y(k-1) = \frac{\Delta t}{t}\{u(k) - y(k)\}$$

where u(k)−y(k) represents an input value, and y(k)−y(k−1) the output value. Using this model, a recurrence equation for estimating $\Delta t/T$ is created as shown below.

$$\varepsilon p(k) = \{y(k) - y(k-1)\} - \{u(k) - y(k)\} \cdot \theta p(k-1)$$

$$\theta p(k) = \theta p(k-1) + \frac{u(k) - y(k)}{\{u(k) - y(k)\}^2} \cdot \varepsilon p(k)$$

where sp(k) denotes an error, and θp(k) an estimated value. From the final value of θp(k) that converges to $\Delta t/T$, the time constant T is obtained as shown below.

$$T = \frac{\Delta t}{\theta p(k)}$$

In the rigidity estimation method, letting K represent the rigidity in the current control cycle, F(k) the force data, y(k) the actual position, and F0 the equilibrium position correcting parameter (offset), a model equation for equating the force to the product of the displacement and the rigidity is created as shown below.

$$F(k) = K \cdot y(k) + F0$$

$$\therefore F(k) = [K \ F0] \cdot \begin{bmatrix} y(k) \\ 1 \end{bmatrix}$$

From the above model equation, the rigidity K is estimated by an adaptive filter; then, the recurrence equation is given by $$\varepsilon k(k) = F(k) - [y(k)\ 1] \cdot \theta k(k-1)$$

$$\theta k(k) = \theta k(k-1) + \frac{[y(k)\ 1]}{(y(k))^2 + 1} \cdot \varepsilon k(k)$$

Updating using the recurrence equation, the column vector θk(k) (consisting of a single column and two rows) converges to $[K\ F0]^T$. The value of the first element of θk(k) is taken as the rigidity K.

Next, a description will be given of how the force control gain G is obtained from the thus determined rigidity K and the time constant T of the position control circuit 8. In the force control circuit of FIG. 3, when the time constant of the force control circuit 7 is sufficiently larger than the time constant T of the position control circuit 8, the force control circuit 7 can be assumed as shown in FIG. 5. In this case, the transfer function from the force command Fd to the force F is expressed by the following equation.

$$\frac{K}{\frac{1}{G} \cdot s + K}$$

This means that the time constant can be regarded as a first-order lag element of (1/G·K)). Accordingly, when the force becomes stable at a certain time, for example, 10T, at which the time constant of the force control circuit 7 is sufficiently larger than the time constant T of the position control circuit 8, then G is set as follows.

$$G \leq \frac{1}{K \cdot 10T}$$

If it is desired to increase the response of the force control as much as possible, G can be set as follows.

$$G = \frac{1}{K \cdot 10T}$$

As described above, according to the present embodiment, the force control gain G can be easily set without having to spend time and labor in the setting of the force control gain G. It also becomes possible to flexibly address changes in the installation of the robot 1 or the machine or in job programs (job steps, etc.), and thus the robot controller 5 having a high degree of versatility can be achieved. Furthermore, by using estimated values for the time constant T and the rigidity K, the effect of noise can be reduced.

The present invention is not limited to the above embodiment, but can be modified in various ways without departing from the spirit and scope of the present invention. For example, in the present embodiment, the estimated values estimated by adaptive filers have been used for the time constant T of the position control circuit 8 and the rigidity K of the robot 1, respectively, but the values obtained by actually measuring them may be used instead of the estimated values. Further, instead of using the adaptive filters, other estimators such as Kalman filters or H∞ filters may be used.

The invention claimed is:

1. A controller, for force-controlling a drive source of a controlled object, having a position control circuit inside a force control circuit in order to define a relative position of the controlled object to a workpiece, and a contact force occurred between the workpiece and the controlled object, the controller comprising:

a first data acquiring portion for acquiring a time constant of the position control circuit based on a position command value to the drive source and an actual position value, during operations of the controlled object;

a second data acquiring portion for acquiring a rigidity value for the controlled object and the workpiece based on a force data obtained when the controlled object is brought into contact with the workpiece; and an automatic gain calculating portion for calculating a force control gain of the force control circuit from the time constant of the position control circuit acquired by the first data acquiring portion and the rigidity value acquired by the second data acquiring portion, under conditions where a time constant of the force control circuit is larger than the time constant of the position control circuit.

2. A controller as claimed in claim 1, wherein the force data is detected by a force sensor which is attached to the controlled object near a position that contacts the workpiece.

3. A controller as claimed in claim 1, wherein the force data is acquired from an electric current value of an actuator that drives the controlled object.

4. A controller as claimed in claim 1, wherein the force control comprises a damping control.

* * * * *